US007572431B2

(12) United States Patent
Seal et al.

(10) Patent No.: US 7,572,431 B2
(45) Date of Patent: Aug. 11, 2009

(54) SYNTHESIS OF TETRAGONAL PHASE STABILIZED NANO AND SUBMICRON SIZED NANOPARTICLES

(75) Inventors: Sudipta Seal, Oviedo, FL (US); Satyajit Shukla, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 192 days.

(21) Appl. No.: 11/502,728

(22) Filed: Aug. 11, 2006

(65) Prior Publication Data
US 2006/0275620 A1    Dec. 7, 2006

Related U.S. Application Data

(62) Division of application No. 10/655,986, filed on Sep. 5, 2003, now Pat. No. 7,288,324.

(60) Provisional application No. 60/408,325, filed on Sep. 5, 2002.

(51) Int. Cl.
*C01G 25/02* (2006.01)
(52) U.S. Cl. .................................. 423/608
(58) Field of Classification Search .................. 501/51, 501/102; 423/608, 462, 504; 428/472, 461, 428/426; 427/248.1
See application file for complete search history.

(56) References Cited

U.S. PATENT DOCUMENTS

| 4,543,341 A * | 9/1985 | Barringer et al. ............... 501/1 |
| 4,732,750 A * | 3/1988 | Olson et al. ................. 423/608 |
| 5,002,909 A * | 3/1991 | Montino et al. .............. 501/105 |
| 5,420,086 A * | 5/1995 | Brandau et al. .............. 501/103 |
| 5,472,795 A * | 12/1995 | Atita ........................... 428/660 |
| 5,800,934 A | 9/1998 | Qadri ........................... 428/633 |
| 6,007,926 A | 12/1999 | Provenzano ................. 428/633 |
| 6,017,839 A | 1/2000 | Majumdar ................... 501/104 |

(Continued)

OTHER PUBLICATIONS

Young Tae Moon, Hong Kyu Park, Do Kyung Kim and Chong Hee Kim Preparation of Monodisperse and Spherical Zirconia Powders by Heating of Alcohol-Aqueous Salt Solutions Apr. 20, 1995, Journal of the American Ceramic Society, 78(8), 2690-4.*

(Continued)

*Primary Examiner*—Melvin C Mayes
*Assistant Examiner*—Smita Patel
(74) *Attorney, Agent, or Firm*—Brian S. Steinberger; Joyce P. Morlin; Law Offices of Brian S. Steinberger, P.A.

(57) ABSTRACT

Novel, monodispersed, spherical $ZrO_2$ particles in the size range of approximately 10 to approximately 600 nm exhibiting metastable tetragonal crystal structure at room temperature and novel methods of preparation. The $ZrO_2$ particles are approximately 100% in the tetragonal phase at room temperature and can be pure and free of foreign oxides. The novel method can include mixing zirconium-alkoxide and an alcohol, forming preparation one, followed by separately dissolving completely de-ionized water and a polymeric steric stabilizer in an alcohol forming preparation two. Next the preparations can be mixed with vigorous stirring while subjecting the materials to hydrolysis and condensation reactions with very slow stirring. Next, there is waiting for the formation of a sol from the mixture, followed by drying at approximately 80 degrees C. to form resultant material followed by crushing the resultant material.

6 Claims, 6 Drawing Sheets

U.S. PATENT DOCUMENTS

| | | | |
|---|---|---|---|
| 6,168,833 B1 * | 1/2001 | Leushake et al. | 427/248.1 |
| 6,203,768 B1 | 3/2001 | Mc Cormick | 423/1 |
| 6,376,590 B2 | 4/2002 | Kolb | 524/413 |
| 6,387,981 B1 | 5/2002 | Zhang | 523/117 |
| 6,482,537 B1 | 11/2002 | Strangman | 428/633 |
| 6,652,987 B2 * | 11/2003 | Allen et al. | 428/622 |

OTHER PUBLICATIONS

Michael Z.-C.Hu, E.Andrew Payzant, and Charles H. Byers Sol-Gel and Ultrafine Particle Formation via Dielectric Tuning of Inorganic Salt-Alcohol-Water Solutions 2000, Journal of Colloid and Interface Science 222, 20-36.*

Robert S. Pavlik Jr., Lisa C. Klein, and Ronald A. McCauley Experimental Design Applied to the Chemical Durability of Sol-Gel Derived Zirconias 1997, Journal of American ceramic society, 80(6) 1469-76.*

Yong Tae Moon et al, Journa-Preparation of Monodisperse and Spherical Zirconia Powders by Heating of Alcohol-Aqueous Salt Solutions, Journal of American Ceramic Society, vol. 78, No. 10 pp. 2690-2694, Oct. 1995.*

(2003) S. Shukla, S. Seal, R Vij & S. Bandyopadhyay. Polymer Surfactant Incorporated Ceramic Oxide Nanoparticles. Rev. Adv. Matter. Sci 4, pp. 109.

(2002) S. Shukla, S. Seal, R Vij & S. Bandyopadhyay. Effect of HPC and Water Concentration on the Evolution of Size, Aggregation and Crystallization of Sol-Gel Nano Zirconia. Journal Nanoparicle Research 4: pp. 553-559.

(2003) S. Shukla, S. Seal, VanFleet. Sol-Gel Synthesis and Phase Evolution Behavior of Sterically Stabilized Nanocrystalline Zirconia. Journal of Sol-Gel Science and Technology 27, pp. 119-136.

(2002) S. Shukla, S. Seal, R. Vij & S. Bandyopadhyay, & Z. Rahman. Effect of Nanocrystallite Morphology on the Metastable Tetragonal Phase Stablization in Zirconia. Nano Letters vol. American Chemical Society pp. 989-993.

(2003) S. Shukla, S. Seal, R. Vij & S. Bandyopadhyay. Reduced Activiation Energy for Grain Growth in Nanocrystalline Yttria-Stabilized Zirconia. Nano Letters vol. 2, No. 9, American Chemical Society pp. 397-401.

* cited by examiner

Fig. 1(a)
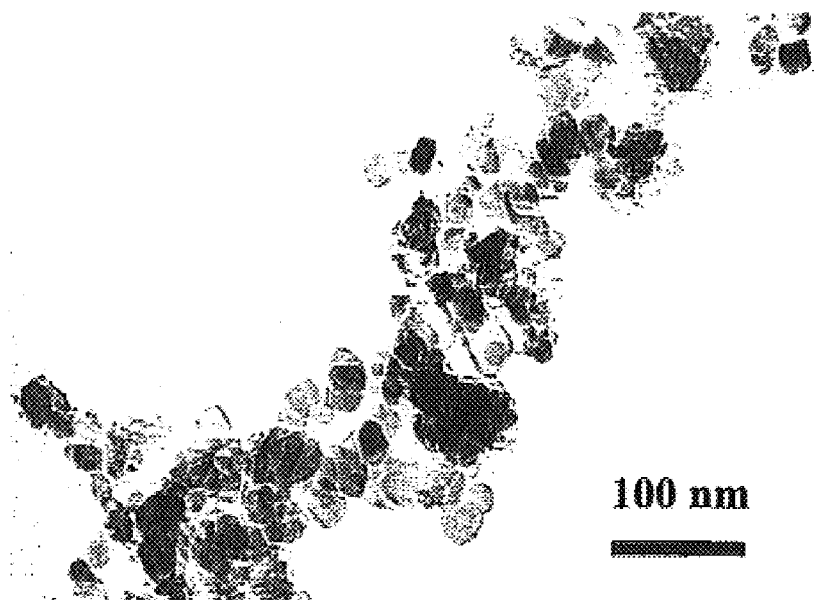
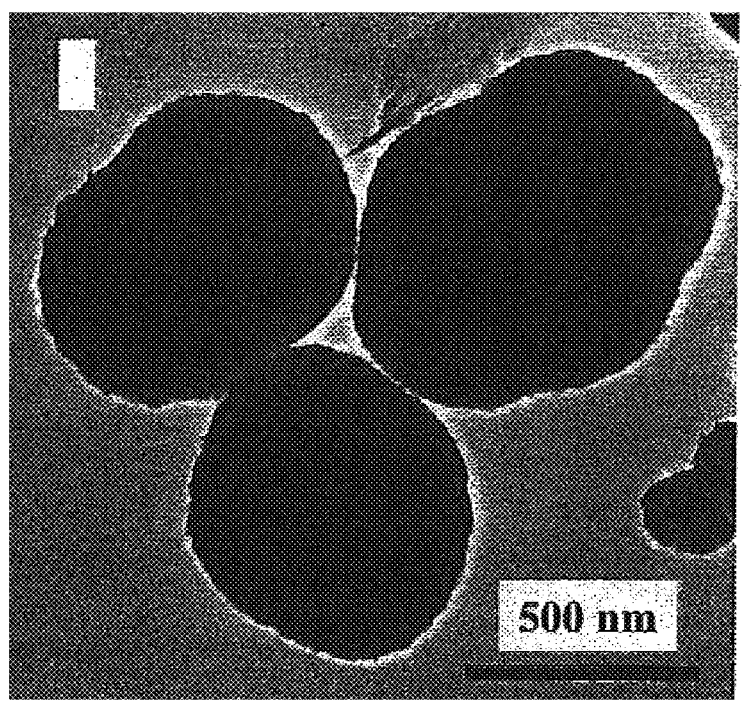
Fig. 1(b)

Fig. 2 (a)
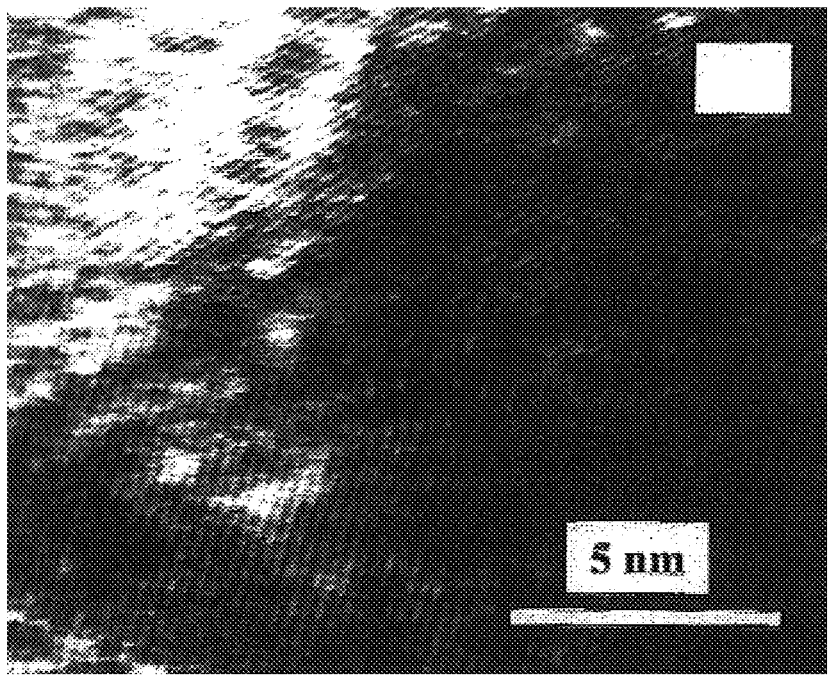
Fig. 2 (b)

SYNTHESIS OF TETRAGONAL PHASE STABILIZED NANO AND SUBMICRON SIZED NANOPARTICLES

This is a Divisional of U.S. patent application Ser. No. 10/655,986 filed Sep. 5, 2003, now U.S. Pat. No. 7,288,324 B1, which claims priority to U.S. Provisional Application 60/408,325 filed Sep. 5, 2002.

FIELD OF INVENTION

This invention relates to nanoparticles and more particular to monodispersed, spherical $ZrO_2$ particles in the size range of approximately 10 to approximately 600 nm. exhibiting metastable tetragonal crystal structure at room temperature and this invention provides the synthesis, for the first time, using the sol-gel technique and without doping any trivalent impurities, of monodispersed, spherical $ZrO_2$ particles in the size range of approximately 10 to approximately 600 nm, exhibiting metastable tetragonal crystal structure at room temperature. This invention has revealed using high-resolution transmission electron microscopy that "hard-aggregates" forming tendency of $ZrO_2$ nandcrystallites of size approximately 30 to approximately 45 nm is responsible for stabilizing the high-temperature metastable tetragonal phase, at room temperature within large sized (500-600) undoped $ZrO_2$ particles.

BACKGROUND AND PRIOR ART

Zirconium ($ZrO_2$) is a well-known structural ceramic, which exhibits tetragonal-to-monoclinic martensitic phase transformation. This phase transformation is of echnological importance as it contributes to the toughening of ceramics. Porter, D. L., Evans, A. G., Heuer, A. H., Acta Metall, 1979, 27, 1649. The tetragonal-to-monoclinic phase transformation is accompanied by volume expansion and can be triggered by hydrostatic and shear stresses. See Simha, N., Truskinovsky, L. Acta Metall. Mater. 1994, 42, 3827.

This type of transformation can take place near the crack tip due to local stress concentration, which can blunt the crack tip as a result of the development of compressive stresses associated with the phase transformation; thus, delaying the crack propagation and resisting subsequent fracture.

Zirconia is used as a dispersed phase in oxide (alumina) (Kosmac, T, Swain, M. V. Clausssen, N, Mater. Sci Eng. 1984, 71,57). as well as non-oxide (carbides, borides, and nitrides) (Swain, M. V. Mater. Forum 1988, 11, 182.) ceramics to increase their fracture toughness, strength, and hardness. This stress induced transformation has also been shown to increase the plasticity from the shape deformation and accommodation strains, which are associated with the transformation. (Muddle, B. C. Kelly, P. M. MaterForum 1988, 11, 182.) Increase in the wear and corrosion resistance of nanostructured ceramic coatings as a result of stress-induced phase transformation has also been reported. (Aita, C. R., In Advances in Catings: TMS Annual Meeting, Warrendale, Pa., 1995 p. 235) Besides this, tetragonal $ZrO_2$ also finds application as catalyst/catalyst support for various gas-phase reactions. (Haruta, M. Kobayashi, T, Sano, H., Yamada, N Chem Lett. 1987, 829, 405 and Knell, A, Barnickel, P, Baiker, A, Wokaum, A. J. Catal. 1992, 137, 306.) Hence, synthesizing ZrO2 particles with metastable tetragonal crystal structure is important.

Doping zirconia with trivalent impurities has been a traditional approach for the metastable tetragonal phase stabilization. (Ping, L, Chen, L. W., Penner-Hahn, J. E., J. Am Ceram Soc. 1994, 77, 188.) Particle size has also been observed to have its own effect on the metastable tetragonal phase stability in nanocrystalline zirconia (Garvie, R. C., J. Phys. Chem 1965, 69, 1238, and Nitsche, R, Rodewald, M, Skandan, G, Guess, H., Hahn, H. Nanostruct. Mater. 1996, 7, 535, and Nitsche, R, Winterer, M, Hahn, H, Nanostruct. Mater. 1995, 6, 1979). Due to the existence of a critical nanoparticle size for the metastable tetragonal phase stabilization, the tetragonal phase stabilization within the submicron sized $ZrO_2$ particles has been unachievable.

SUMMARY OF THE INVENTION

The first objective of this invention is to provide ultra fine approximately 10 to approximately 600 nm and more particularly approximately 10 to approximately 30 nm and submicron sized (approximately 500 to approximately 600 nm) $ZrO_2$ nanoparticles that are in the metastable tetragonal phase.

The second objective of this invention is to provide a method for synthesizing particles of the size range of approximately 10 to approximately 600 nm and more particularly nano (approximately 10 to approximately 30 nm) and sub micron (approximately 500 to approximately 600 nm) $ZrO_2$ nanoparticles in the metastable tetragonal phase.

The third objective is to provide coatings of $ZrO_2$ coatings on metal substrates.

A preferred embodiment of the invention includes monodispersed, spherical zirconia ($ZrO_2$) particles of approximately 10 to approximately 600 nm, which exhibit metastable tetragonal crystal structure at room temperature. The $ZrO_2$ particles are approximately 100% in the tetragonal phase at room temperature, and the particles are pure and free of foreign oxides.

A preferred method for the synthesis of monodispersed, spherical $ZrO_2$ particles, which exhibit approximately 100% metastable tetragonal structure at room temperature, of sizes of approximately 10 to approximately 600 nm, in powder form can include various steps. The initial step can include mixing zirconium-alkoxide and an alcohol, forming preparation one, followed by separately dissolving completely deionized water and a polymeric steric stabilizer in an alcohol forming preparation two. Next the preparation one and the preparation two can be mixed with vigorous stirring for a approximately few minutes only, subjecting the materials to hydrolysis and condensation reactions with very slow stirring. Next, there is waiting for the formation of a sol from the mixture. Next, there is drying at approximately 80 degrees C. to form resultant material followed by crushing the resultant material.

The polymeric steric stabilizer can be an organic polymer containing —OH or ether group. The polymeric steric stabilizer can be from one of the group consisting of hydroxypropyl cellulose polymer (HPC), polyvinylalcohol, ethylene glycol, and hexamethyldisilazane. The zirconium-alkoxide can be zirconium (IV) n propoxide and the alcohol can be anhydrous alcohol. Synthesis can take place under normal atmospheric conditions. The polymeric steric stabilizer can be an HPC polymer, and have a molecular weight of approximately 80,000 to approximately 1,000,000.

Further objects and advantages of this invention will be apparent from the following detailed description of the presently preferred embodiments which are illustrated schematically in the accompanying drawings.

BRIEF DESCRIPTION OF THE FIGURES

FIG. 1a shows nanocrystalline (approximately 20 to approximately 25 nm) sized spherical $ZrO_2$ particles synthesized using the sol-gel technique under the processing conditions of R=60 and HPC=1.0 g/L.

FIG. 1b shows monodispersed, submicron sized approximately 500 to approximately 600 nm spherical $ZrO_2$ particles synthesized using the sol-gel technique under processing conditions of R=5, and HPC=1.0 g/L.

FIG. 5a shows typical narrow scan XRD patterns obtained for monodispersed, submicron sized (approximately 500 to approximately 600 nm), spherical $ZrO_2$ particles, after calcination at 400° C. for 2 h, synthesized under the processing conditions of R=5, and HPC=1.0 g/L.

FIG. 5b shows typical narrow scan XRD patterns obtained for monodispersed, submicron sized (approximately 500 to approximately 600 nm), spherical $ZrO_2$ particles, after calcination at 600° C. for 2 h, synthesized under the processing conditions of R=5, and HPC=1.0 g/L.

DESCRIPTION OF THE PREFERRED EMBODIMENTS

Figure 2:
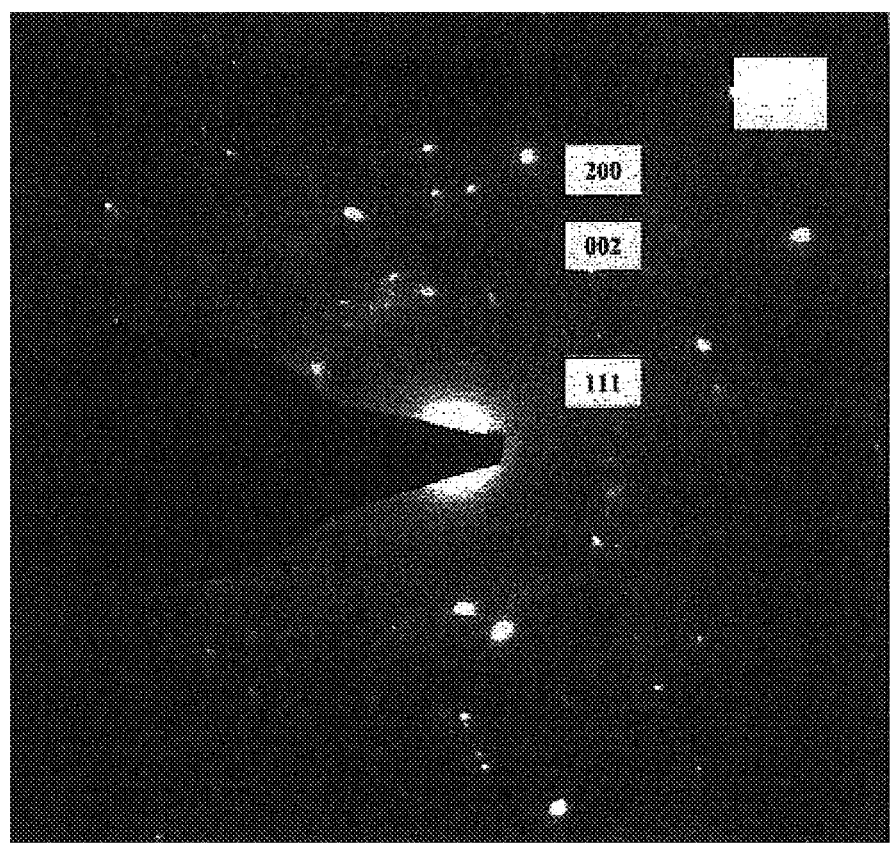
FIG. 2a shows HRTEM analysis of monodispersed submicron sized spherical $ZrO_2$ particles synthesized under the processing conditions of R=5 and HPC=1.0 g/L after calcinations at 400 degrees for 2 hours.
FIG. 2b shows the SAED patterns obtained for monodispersed, submicron sized (approximately 500- approximately 600 nm) spherical $ZrO_2$ particles at the edge of a particle after calcination at 400 degrees C. for 2 hours.
FIG. 2c shows SAED patterns obtained for monodispersed submicron sized (approximately 500 to approximately 600 nm) spherical $ZrO_2$ particles at the center of a particle after calcinations at 400 degrees C. for 2 hours.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This invention demonstrates for the first time that, at room temperature, the stability of the metastable tetragonal phase within the submicron sized $ZrO_2$ particles strongly depends on the aggregation tendency of $ZrO_2$ nanocrystallites. As a result of strong aggregation of $ZrO_2$ nanocrystallites, the inventors have been able to synthesize both nano (approximately 10 to approximately 30 nm) and large sized (approximately 500 to approximately 600 nm) $ZrO_2$ particles having 100% tetragonal crystal structure. This particle size is much larger than the critical size of approximately 6 nm, reported in the prior art, for the stabilization of 100% tetragonal phase.

To prepare the nanoparticles of the invention, pure zirconium(IV) n-propoxide anhydrous ethanol (approximately 200 proof) and the HPC polymer (hydroxyproylcellulose, molecular weight approximately 80,000 g/mol) used as a polymeric steric stabilizer were obtained from Aldrich Co and were used as received Other alcohols and zirconium alkoxides may also be used. Other polymeric steric stablilzers may also be used such as any compound with —OH or ether groups, for example polyvinylalcohol, ethylene glycol, or hexamethyldisilazane.

Other ceramic oxides can be used in addition to zirconium, for example, tin, indium, and titanium.

Nanocrystalline $ZrO_2$ powder is synthesized by hydrolysis of zirconium (IV) n-propoxide in an alcohol solution. The beakers used in the experiments were cleaned, washed with deionizer water, dried completely and rinsed with anhydrous 200 proof ethanol. During synthesis, two different but equal parts of alcohol solutions were prepared. In the first part, deionized water was dissolved into anhydrous 200 proof ethanol using two different R values (R)=5 and 60, which is the ratio of molar concentration of water to zirconium(IV) n-propoxide. HPC polymer (HPC)=1.0 g/L was then added to this part and was dissolved completely by stirring the solution overnight using a magnetic stirrer. The second part of the alcohol solution was then prepared by completely dissolving zirconium (IV) n-propoxide (0.1 M) in anhydrous 200 proof ethanol under normal atmospheric conditions and homogenized using magnetic stirring for a few minutes only. After preparing each solution, both the beakers were sealed immediately with paraffin tape. Hydrolysis of zirconium(I) n-propoxide was then carried out under atmospheric conditions by rapidly mixing the two sealed solutions under vigorous stirring. The formation of $ZrO_2$ particles was evident from the white color of the resulting sol due to immediate precipitation.

The sol was stirred very slowly for approximately 4 hours and then held under static conditions for 24 h to ensure completion of the hydrolysis and condensation reactions. The sol was subsequently dried at approximately 80° C. using Petri dishes in order to remove the solvent completely. The small gel pieces obtained were then crushed to obtain the nanocrystalline $ZrO_2$ powder, which was calcined at different temperatures ranging from approximately 400° to approximately 800° C. in air for the phase evolution study. The samples were heated at a rate of approximately 30° C./min up to the calcination temperature, held at that temperature for 2 hours, and then slowly cooled to room temperature in the furnace. The as-synthesized nanocrystalline ZrO2 powders were then examined using a Phillips EM400 transmission electron microscope (TEM) at 120 kV. A high-resolution field TEM (HRTEM) (FEI-Philips Tecnai F30) was used to observe lattice images showing different orientations of nanocrystals within a submicron sized $ZrO_2$ particle, after calcination at approximately 400° C. for 2 h. Bright field TEM images at 300 kV were taken to observe the lattice. Selected-area electron diffraction (SAED) patterns were taken to analyze the crystal structure. SAED patterns collected near the edge and from the center of the particle, provided the presence of nanocrystals within a submicron sized particle.

The crystalline phases present in the as-synthesized and calcined powders were also determined using a standard Rigaku X-ray diffractometer (XRD). Line traces were obtained over 2t values ranging from approximately 10° to approximately 80°. Narrow scan analysis was conducted in the 2t range of approximately 29.5° to approximately 31.5°, as it contained the strongest line for the tetragonal (111)t phase. This intense peak was then curve fitted using the peak-fit software (peak-fit, version-4, SPSS Inc.). The average tetragonal crystallite size (Dt) was calculated from the (111)t diffraction peak using Scherrer's equation, where, D is the average crystallite size in nm, Ï is the radiation wavelength (approximately 0.154 nm), β' is the corrected halfwidth at half-intensity (fwhm) and t is the diffraction peak angle.

TEM images of nanocrystalline and submicron sized $ZrO_2$ particles synthesized via the sol-gel technique, under the processing conditions of R) 60 and R) 5, at [HPC])g/L, are shown in FIGS. 1a and 1b, respectively. $ZrO_2$ nanocrystallites of size approximately 20 to approximately 25 nm are synthesized under the processing conditions of R) 60, [HPC]) approximately 1.0 g/L, FIG. 1a. $ZrO_2$ nanocrystallites form "loose-agglomerates" under these processing conditions. On the other hand, monodispersed, submicron sized (approximately 500 to approximately 600 nm), spherical $ZrO_2$ particles are formed under the synthesis conditions of R) 5, [HPC]) 1.0 g/L, FIG. 1b. An HRTEM image obtained from the edge of one of the $ZrO_2$ particle, FIG. 1b, after annealing at 400° C. for 2 h, is shown in FIG. 2a.

Figure 3:
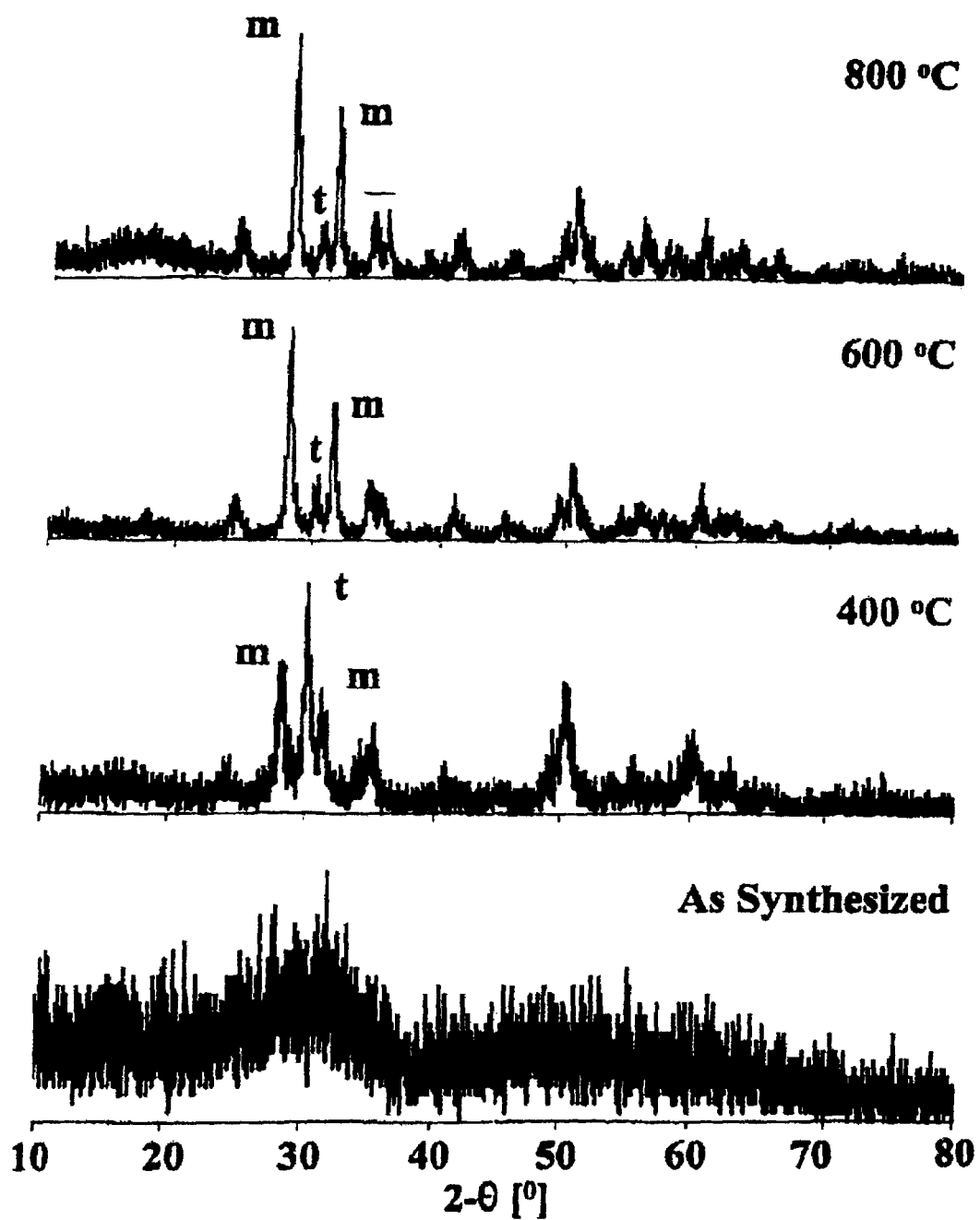
FIG. 3 shows typical broad scan XRD patterns, within 20 range of 10 degrees to 80 degrees, obtained for nanocrystalline $ZrO_2$ particles of size approximately 20 to approximately 25 nm after calcinations at 400 degrees C. for 2 hours, synthesized under the processing conditions of R=60, and HPC=1.0 g/L.
Figure 4:
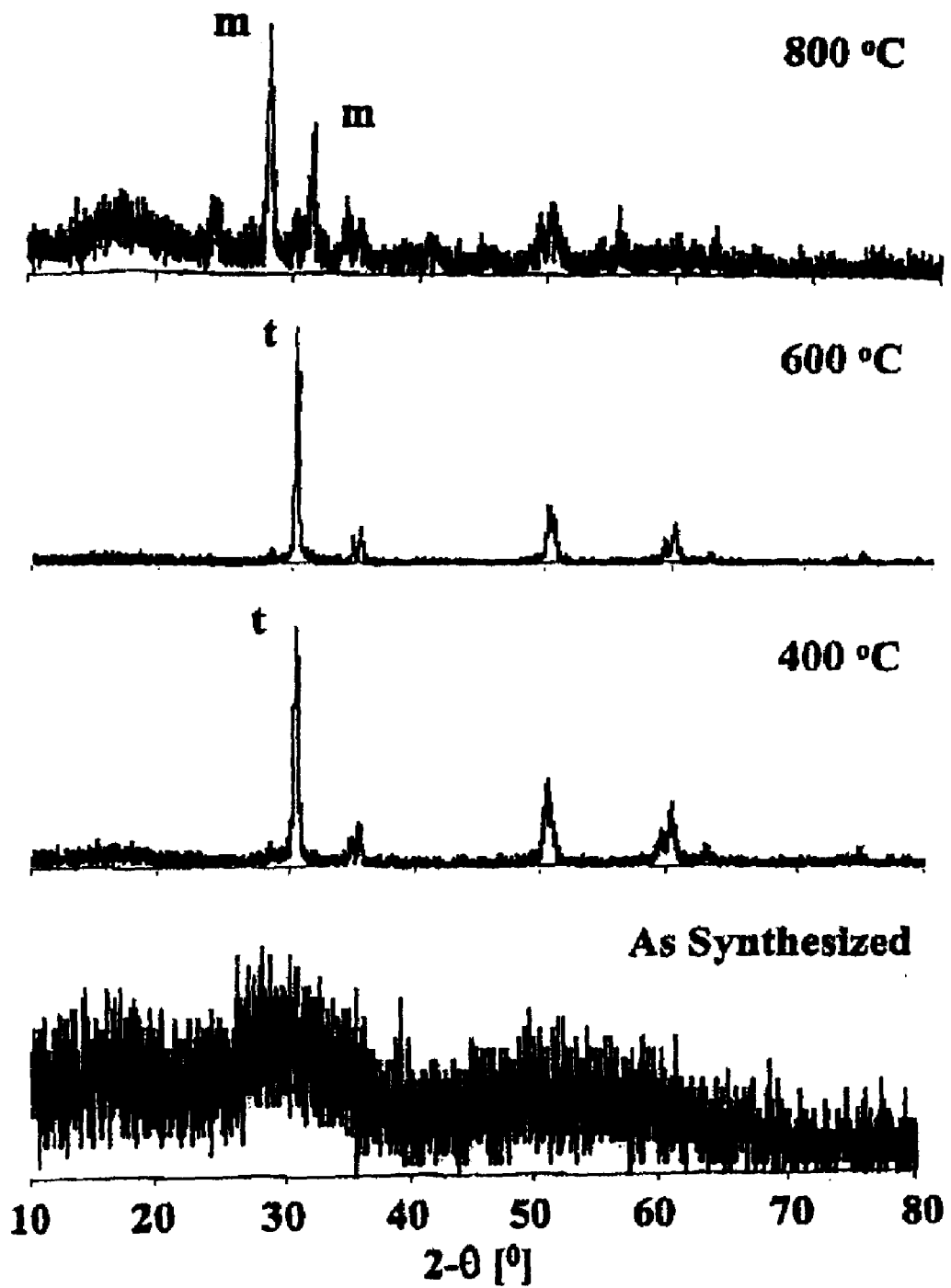
FIG. 4 shows typical broad scan XRD patterns, within 2t range of approximately 10° to approximately 80°, obtained for monodispersed, submicron sized (approximately 500 to approximately 600 nm), spherical $ZrO_2$ particles, after calcination at 400° C. for 2 h, synthesized under the processing conditions of R=5, and HPC=1.0 g/L.

Two tetragonal lattices are observed in FIG. 2a having different relative orientations. SAED images obtained form the edge and the center of ZrO2 particle, FIG. 1b, after annealing at approximately 400° C. for 2 h, are shown in FIGS. 2b and 2c, respectively. More diffraction spots are observed in the SAED pattern obtained from the center of the $ZrO_2$ particle, FIG. 2c, than are obtained from the edge of the particle, FIG. 2b. In fact, we observed a gradual increase in the number of diffraction spots when traversed from the edge toward the center of the particle. This indicates that a larger number of nanocrystallites are located at the center of the particle than that at the particle edge. Typical broad-scan XRD patterns obtained for ZrO2 particles synthesized under the two different processing conditions, FIGS. 1a, 1b are presented in FIGS. 3 and 4 respectively, as a function of calcination temperature. The as-synthesized ZrO2 particles are observed to be X-ray amorphous; however, they crystallize at the calcinations temperature of approximately 400 degrees C. $ZrO_2$ nanocrystallites of size approximately 20 to approximately 25 nm exhibit tetragonal and monoclinic crystal structure after calcinations at approximately 400 degrees C. for 2 h, as shown in FIG. 3. Tetragonal-to-monoclinic phase transformation is observed at approximately 600 degrees C., which increases the relative volume fraction of monoclinic phase at the expense of the tetragonal phase. The phase transformation almost goes to completion after calcinations at approximately 800 degrees C.

Thus, gradual transformation of tetragonal phase to monoclinic phase is observed for $ZrO_2$ nanocrystallites of size approximately 20 to approximately 25 nm with increasing calcinations temperature within the range of approximately 400 to approximately 800 degrees C. On the other hand, monodispersed, submicron sized (approximately 500 to approximately 600 nm) spherical $ZrO_2$ particles do not exhibit gradual phase transformation as a function of increasing calcination temperature, FIG. 4. The high-temperature metastable tetragonal phase is observed to nucleate from the amorphous phase at approximately 400° C. and is also observed to be stable after calcination at approximately 600° C. No monoclinic phase is detected at the calcination temperatures of approximately 400° C. and approximately 600° C. However, when calcined at approximately 800° C., almost complete tetragonal to monoclinic phase transformation is observed.

Typical narrow XRD scans of the (111)t peak, corresponding to the tetragonal phase, for monodispersed, submicron sized, spherical $ZrO_2$ particles, after calcination at approximately 400° C. and approximately 600° C., are shown in FIGS. 5a and 5b, respectively. The crystallite size of approximately 45 nm is calculated using Scherrer's equation (Cullity, B. D., 1978. Elements of S-Ray Diffraction, Addison-Weley, Massachusetts.) for monodispersed, submicron sized, spherical $ZrO_2$ particles after calcination at approximately 400° C. Moreover, decrease in the FWHM is observed in FIG. 5 with increase in the calcination temperature.

Figure 6A:
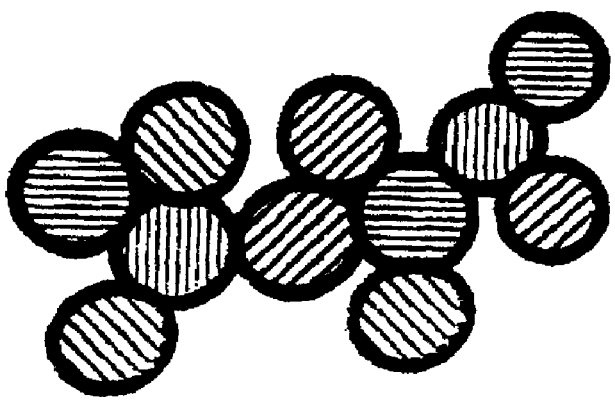
FIG. 6a provides schematic diagrams showing the $ZrO_2$ nanocrystallites forming loose-aggregates.
Figure 6B:
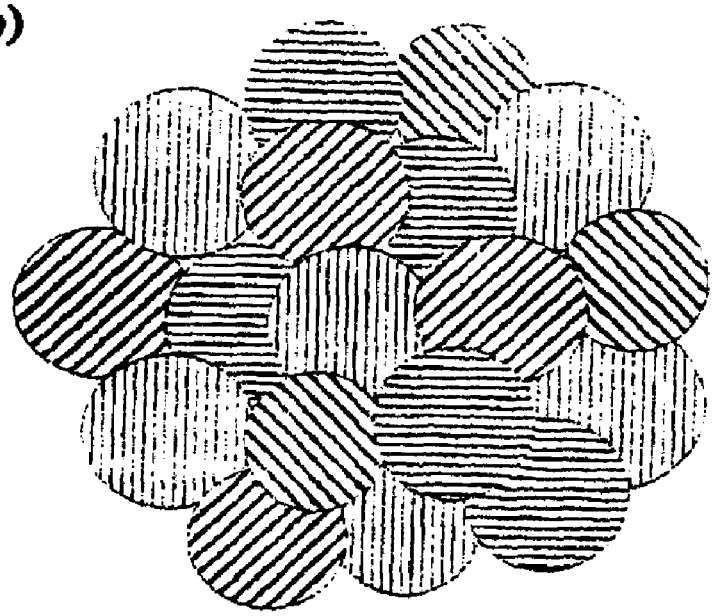
FIG. 6b provides schematic diagram showing the $ZrO_2$ nanocrystallites forming hard-aggregates.

TEM analysis reveals that the $ZrO_2$ nanoparticles of size approximately 20 to approximately 25 nm synthesized at large R value 60 form "loose-agglomerates" as schematically shown in FIG. 6a. The formation of loose-agglomerates is due to high nucleation rates associated with large R value. By contrast, XRD and HRTEM analysis and corresponding SAED patterns obtained for monodispersed, submicron sized, spherical $ZrO_2$ particles, after calcination at approximately 400° C., indicate that these particles are made up of small nanocrystallites of size approximately 45 nm, as schematically shown in FIG. 6b. It appears that $ZrO_2$ nanocrystallites form "hard-aggregates" under the processing conditions of R 5, [HPC]) 1.0 g/L, due to very slow kinetics of hydrolysis and condensation reactions associated with low R value.

The submicron sized $ZrO_2$ particles of size approximately 500 to approximately 600 nm are expected to exhibit monoclinic crystal structure at room temperature, as the particle size is much greater than the critical size of approximately 6 nm to have any thermodynamic effect for high-temperature metastable tetragonal phase stabilization. The tendency of the $ZrO_2$ nanocrystallites to form hard-aggregates and loose-agglomerates is, however, observed to significantly affect its phase transformation behavior at higher temperatures.

The temperature of metastable tetragonal polymorph of $ZrO_2$ is stabilized at room temperature within the monodispersed submicron sized (approximately 500 to approximately 600 nm) spherical $ZrO_2$ particles without doping any trivalent impurity. Various theories have been proposed for the stabilization of metastable tetragonal phase in nanocrystalline $ZrO_2$ at room temperature.

Figure 6C:
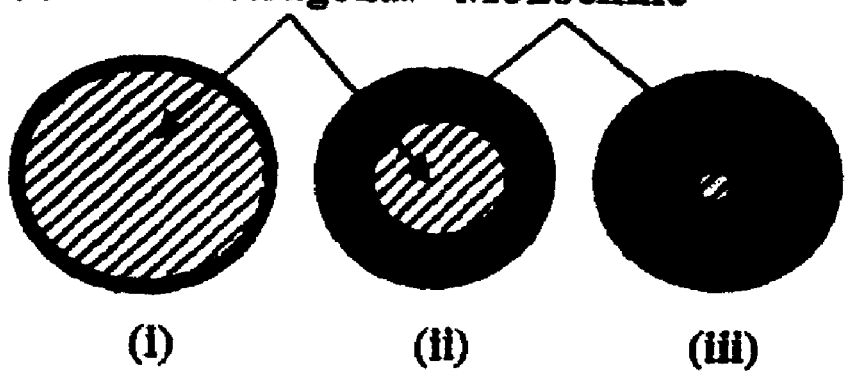
FIG. 6c provides a schematic representation of the athermal nature of tetragonal to monoclinic phase transformation in nanocrystalline $ZrO_2$. The calcination temperature increases from (i) to (iii) represents the temperature range of 400-800° C.

Garvie, (R. C. J Phy. chem, 1965, 69, 1238) experimentally (using XRD) and using thermodynamic calculations, showed the existence of a critical size of 20 nm, below which the metastable tetragonal phase is stable in nanocrystaline $ZrO_2$ and above which the monoclinic phase is stable. Mitsuhashi et al, (J. Am. Ceram. Soc. 1974, 57, 97) however, showed that-the metastable tetragonal phase can be stabilized in $ZrO_2$ nanocrystallites of size greater than approximately 30 nm due to the strain energy involved at the interphase boundaries resulting from the simultaneous presence of monoclinic and tetragonal phases within the crystallites. By HRTEM analysis Nitsche et al further showed that the critical size for 100% tetragonal phase stabilization in nanocrystalline $ZrO_2$ is about 6 nm, above which $ZrO_2$ nanocrystallites exist as a core-shell particles with tetragonal phase, as a core and monoclinic phase as a shell. In our invention, ZrO2 nanocrystallites of size as small as about 20 to about 25 nm are synthesized (FIG. 1a) which are larger than the critical size of about 6 nm for the stabilization of the about 100% tetragonal phase. This is probably the reason for the appearance of tetragonal as well as monoclinic phases when these $ZrO_2$ nanocrystallites are calcined at the crystallization temperature of 400 degrees C. With increased calcinations temperature above 400 degrees C., the phase transformation possibly proceeds in a manner as described schematically in FIG. 6c.

The tetragonal-to-monoclinic phase transformation in $ZrO_2$ is athermal in nature. As a result, a specific amount of monoclinic phase is formed at each calcination temperature, as observed in FIG. 3. As mentioned earlier, monodispersed, submicron sized (approximately 500 to approximately 600 nm), spherical $ZrO_2$ particles are composed of small nanocrystallites of size approximately 45 nm after calcination at 400° C. The nanocrystallite size of approximately 45 nm is also larger than the predicted and observed critical size of approximately 30 nm10 and approximately 6 nm11,12 respectively for approximately 100% metastable tetragonal phase stabilization. However, interestingly, no monoclinic phase formation is observed after crystallization of submicron sized $ZrO_2$ particles at 400° C., FIG. 4.

Moreover, the nanocrystallites within the submicron sized ZrO2 particles are observed to grow due to calcination at 600° C., which is indicated by the decrease in the FWHM of the (111)t peak with increase in the calcination temperature. Even after the growth of the nanocrystallites above approximately 45 nm size, no tetragonal to monoclinic phase transformation is observed at approximately 600° C. Hence, the tetragonal-to-monoclinic phase transformation appears to be suppressed within the submicron sized $ZrO_2$ particles at 600° C. Thus, the phase evolution behavior exhibited by the monodispersed, submicron sized (approximately 500 to approximately 600 nm), spherical $ZrO_2$ particles is in contrast with that of $ZrO_2$ nanocrystallites of size approximately 20 to approximately 25 nm.

It is noted that ZrO2 nanocrystallites (approximately 45 nm) form hard-aggregates of size approximately 500 to approximately 600 nm, under the processing conditions of R 5, [HPC]) 1.0 g/L, while $ZrO_2$ nanocrystallites of size approximately 20 to approximately 25 nm, synthesized under the processing conditions of R) 60, [HPC]) 1.0 g/L, form loose-agglomerates. It appears that due to the formation of hard-aggregates, the tetragonal-to-monoclinic phase transformation, which is accompanied by volume expansion, is suppressed at approximately 400° C. and approximately 600° C. As a result, monodispersed, submicron sized (approximately 500 to approximately 600 nm), spherical $ZrO_2$ particles having metastable tetragonal crystal structure are successfully synthesized in the present investigation.

The stabilization of metastable of tetragonal phase via proposed mechanism, which involves the suppression of volume increase associated with the tetragonal-to-monoclinic phase transformation, due to dense agglomeration of nanocrystallites within monodispersed, submicron sized (approximately 500 to approximately 600 nm), spherical $ZrO_2$ particles, is supported by the following observations. First, the volume expansion associated with the tetragonal to monoclinic phase transformation would cause many stresses and strains to be included in the structure that might lead to fracture of the particles. However, no such type of fracture of monodispersed, submicron sized (approximately 500 to approximately 600 nm), spherical $ZrO_2$ particles has been observed, which supports the stabilization of tetragonal phase in the large sized particles. Second, there is substantial evidence (obtained via HRTEM) of little or no free volume in the monodispersed, submicron sized (approximately 500 to approximately 600 nm), spherical $ZrO_2$ particles. Analogous to the glass transition in polymers, if there were free volume in these large particles, this excess free volume would permit the phase transition to take place. Finally, considering the precursors involved during the sol gel synthesis of $ZrO_2$ particles, there is no evidence of any group III impurity that might be otherwise stabilizing the tetragonal phase.

Nanosized (approximately 20 to approximately 25 nm) and submicron sized (approximately 500 to approximately 600 nm), monodispersed, spherical $ZrO_2$ particles are successfully synthesized using the sol-gel technique. The tendency of $ZrO_2$ nanocrystallites (approximately 45 nm) to form hard-aggregates is observed to be responsible for the high-temperature metastable tetragonal phase stabilization, at room temperature, within the submicron sized $ZrO_2$ particles.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for preparing monodispersed, spherical $ZrO_2$ particles, pure and free of foreign oxides, comprising the steps of:

preparing equal parts of an alcohol solution wherein a first part is mixed with deionized water and a second part is mixed with a zirconium-alkoxide using an R-value of 5 to get approximately 500 nm to approximately 600 nm $ZrO_2$ particles, wherein the R-value comprises the ratio of molar concentrations of water to the zirconium-alkoxide;

adding a polymeric steric stabilizer to the first part of an alcohol solution with deionized water, wherein the stabilizer is in a concentration of approximately 1.0 to approximately 2.0 g/L and stirring over time forming solution one;

dissolving the zirconium-alkoxide in the second part of the alcohol solution and forming solution two;

mixing the solution one and the solution two together;

stirring the mixture for approximately 4 hours;

holding the stirred solution under static conditions for approximately 24 hours to form a resultant material;

crushing the resultant material; and calcining the crushed material at a temperature of approximately 400 to approximately 600 degrees C. to prepare spherical zirconium oxide particles exhibiting approximately 100% metastable tetragonal structure at room temperature.

2. The method, as in claim 1, wherein said polymeric steric stabilizer is an organic polymer containing —OH groups or ether groups.

3. The method, as in claim 2 wherein said polymeric steric stabilizer is one of the group consisting of HPC polymer, polyvinylalcohol, ethylene glycol, and hexamethyldisilazane.

4. The method in claim 3, wherein said polymeric steric stabilizer is HPC polymer.

5. The method, as in claim 4 wherein HPC is added in a concentration of approximately 1.0 g/L.

6. The method, as in claim 4 wherein said HPC polymer has a molecular weight of approximately 80,000 to approximately 1,000,000 g/mol.

\* \* \* \* \*